United States Patent
Bruce et al.

(10) Patent No.: US 10,487,241 B2
(45) Date of Patent: Nov. 26, 2019

(54) METHODS OF ENCAPSULATING ELECTRICAL WINDINGS IN AN ENCAPSULANT COMPOSITION

(71) Applicant: ROLLS-ROYCE plc, London (GB)

(72) Inventors: Graham Philip Bruce, Nottingham (GB); John James Anthony Cullen, Derby (GB); Stephen Mark Husband, Derby (GB); Yongxin Pang, Middlesbrough (GB); Simon Hodgson, North Yorkshire (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/783,466

(22) Filed: Oct. 13, 2017

(65) Prior Publication Data

US 2018/0037771 A1 Feb. 8, 2018

Related U.S. Application Data

(63) Continuation of application No. 14/266,005, filed on Apr. 30, 2014, now abandoned.

(30) Foreign Application Priority Data

May 15, 2013 (GB) .................................. 1308704.4

(51) Int. Cl.
  *C09D 183/06* (2006.01)
  *H01B 3/00* (2006.01)
  *H01F 5/06* (2006.01)

(52) U.S. Cl.
  CPC ........... *C09D 183/06* (2013.01); *H01B 3/002* (2013.01); *H01F 5/06* (2013.01); *Y10T 428/31663* (2015.04)

(58) Field of Classification Search
  CPC .. H01B 9/04; H01B 11/1813; H01B 11/1821; C09D 183/06; Y01T 428/31663
  See application file for complete search history.

(56) References Cited

U.S. PATENT DOCUMENTS

| | | | | |
|---|---|---|---|---|
| 2,941,905 A | * | 6/1960 | Hofmann | H01B 3/006 428/329 |
| 3,308,414 A | * | 3/1967 | Ostrander | H01B 3/085 174/110 R |
| 3,984,449 A | * | 10/1976 | Brown, Jr. | C08G 77/04 556/417 |
| 4,039,924 A | | 8/1977 | Scales et al. | |
| 5,304,739 A | * | 4/1994 | Klug | H01B 3/443 174/102 R |
| 6,387,518 B1 | * | 5/2002 | Wolfer | C08K 3/22 106/18.12 |
| 6,605,683 B1 | * | 8/2003 | Zhang | C08G 77/045 428/447 |
| 2003/0158294 A1 | * | 8/2003 | Chaudhuri | C08K 3/08 523/205 |
| 2007/0148409 A1 | * | 6/2007 | Rios | A43B 13/22 428/167 |
| 2011/0147040 A1 | * | 6/2011 | Hodgson | H01B 3/46 174/110 A |

FOREIGN PATENT DOCUMENTS

| | | |
|---|---|---|
| EP | 0 460 238 A1 | 12/1991 |
| WO | 2007/121520 A1 | 11/2007 |
| WO | 2009/150463 A1 | 12/2009 |

OTHER PUBLICATIONS

Witucki. "A Silane Primer: Chemistry and Applications of Alkoxy Silanes". 57th Annual Meeting of the Federation Societies for Coatings Technology (Year: 1992).*
Oct. 9, 2014 Search Report issued in European Application No. 14 16 6291.
Oct. 28, 2016 Office Action Issued in U.S Appl. No. 14/266,005.
Jun. 13, 2017 Office Action Issued in U.S. Appl. No. 14/266,005.
Nanko, "Definitions and Categories of Hybrid Materials," The AZo Journal of Materials Online, Aug. 2009, vol. 6, pp. 1-7.
Dec. 4, 2013 British Search Report issued in British Application No. 1308704.4.

* cited by examiner

*Primary Examiner* — Jose Hernandez-Diaz
(74) *Attorney, Agent, or Firm* — Oliff PLC

(57) ABSTRACT

A method of encapsulating an electrical winding in an encapsulant composition. The method includes: (i) providing an electrically insulated wire; (ii) applying the encapsulation composition to the electrically insulated wire to encapsulate the wire; and (iii) winding a further layer of wire around the encapsulated wire. The electrical encapsulant composition includes a silica containing inorganic-organic nano-hybrid matrix, and particles of refractory ceramic suspended in the inorganic-organic nano-hybrid matrix.

15 Claims, 5 Drawing Sheets

210   210

METHODS OF ENCAPSULATING ELECTRICAL WINDINGS IN AN ENCAPSULANT COMPOSITION

FIELD OF THE INVENTION

The present invention relates to an electrical apparatus encapsulant, particularly though not exclusively to an electrical encapsulant for a high temperature electrical machine, and an electrical machine comprising the encapsulant.

BACKGROUND TO THE INVENTION

The development of electrical apparatus such as electrical machines for use in high temperature environments places significant demands on components associated with the apparatus. In particular, there is a requirement for stability of the materials from which the components are constructed. Such machines generally comprise electrical windings embedded in an electrical encapsulant, sometimes also known as an impregnant. Such encapsulants provide mechanical stability and secondary electrical insulation of the electrical windings in addition to that provided by the insulating material surrounding the wires of the coil. Environments requiring stability of electrical encapsulants at high temperature include those associated with nuclear reactors and next generation aircraft motors and generators, particularly where forced cooling is not available.

In addition to heat from an environment in which a component is situated, a component may be subjected to heat due to other factors such as an electrical current carried by a conductor as well as other stresses. For example, encapsulant compositions used to mechanically encapsulate electrical windings of high temperature electrical machines are subject to particularly harsh thermal and mechanical conditions. The integrity of such encapsulants is critical to continued successful operation of the motor or generator. In some cases, encapsulants in electrical machines must operate for 20 years or longer at temperatures of 450° C. or higher.

A major barrier restricting the operating temperature of electrical machines is the limited thermal stability of the encapsulant material. Breakdown of encapsulant materials can occur at excessively high temperatures, or following prolonged exposure to high temperatures. Such breakdown may lead to mechanical or electrical failure of the electrical machine. High temperature electrical encapsulants must also be relatively flexible in order to accommodate movement and thermal expansion of the encapsulated coils.

Such encapsulants must also be compatible with wire insulation used in high temperature electrical machines. By "compatible", it will be understood that the encapsulant and wire insulation must have similar physical and chemical properties, such as having similar coefficients of thermal expansion, and being relatively chemically inert with each other at typical operational temperatures.

Suitable high temperature wire insulation materials generally comprise solid or woven ceramic based materials. One known high temperature wire insulation material is described in international patent application WO2009150463. The wire insulation material described therein comprises a first organo-alkoxide $^1R_xSi(O^1R')_{4-x}$ and a second organo-alkoxide $^2R_xSi(O^2R')_{4-x}$, where $^1R$ is a non-hydrolysable organic moiety thermally stable to a temperature of at least 150° C., $^2R$ is a non-hydrolysable organic moiety containing a functional group that can react with another like functional group to form an organic polymer, $^1R'$ and $^2R'$ are alkyl radicals and x is an integer from 0 to 3; and an inorganic filler material which together form an inorganic-organic nano hybrid material.

Inorganic-organic nano hybrid materials are materials comprising organic and inorganic components linked together by covalent or non-covalent bonds at a nano-meter scale. These materials differ from nano-composites for example by the chemical bonding between the organic and inorganic components. Examples and a discussion of prior nano-hybrid materials is disclosed in "Definitions and Categories of Hybrid Materials" by Makoto Nanko, published in The AZo Journal Of Materials Online.

The present invention describes an electrical encapsulant composition and an electrical machine comprising the electrical encapsulant which seeks to overcome some or all of the above problems.

SUMMARY OF THE INVENTION

According to a first aspect of the present invention, there is provided an electrical encapsulant composition comprising a silica containing inorganic-organic nano-hybrid matrix, and particles of refractory ceramics suspended in the inorganic-organic nano-hybrid matrix.

Accordingly, the invention provides an electrical encapsulant having a high thermal stability, mechanical toughness and dielectric strength. Furthermore, the particulate ceramics reduce the overall volume contraction induced by curing of the inorganic-organic nano-hybrid, as well as reducing the material cost substantially. Consequently, the encapsulant is both physically and chemically compatible with known high temperature wire insulation materials, and is suitable for a wide range of applications. The encapsulant is also suitable to a wide range of encapsulation methods.

The inorganic-organic nano-hybrid matrix may comprise one or more of a linear, branched and cross linked inorganic-organic nano-hybrid material comprising an organic moiety comprising Si—R, where Si represents a silicon atom and R represents an organic radical which may contain between 1 and 18 carbon atoms, and may contain one or more of oxygen, nitrogen and halogen atoms. The presence of an organic moiety comprising Si—R provides an inorganic-organic nano-hybrid matrix having high strength when cured, and relative low volume shrinkage during curing. The organic radical R may have a high thermal stability, and may be chosen from one or more of the group methyl, ethyl, trifluoromethyl, perfluoroethyl, phenyl, chlorophenyl, pentafluorophenyl, hydrogen, vinyl, glycidyloxypropyl and cyanoethyl. This group has been found to have a high thermal stability. This group have also been found to react with itself or another group to form a chemical bond, which is required to enable the hybrid curing process in some cases. The R group in the inorganic-organic nano-hybrid can be chosen to modify the thermal expansion and conductivity of the encapsulant for compatibility with the wire insulation materials, i.e. to substantially match that of a chosen wire insulation material.

Where the inorganic-organic nano-hybrid matrix comprises a linear inorganic-organic nano-hybrid, the inorganic-organic nano-hybrid may have the general formula:

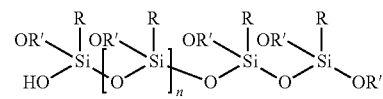

where R represents an organic radical which may contain between 1 and 18 carbon atoms and may contain one or more of oxygen, nitrogen and halogen atoms, O represents an oxygen atom, H represents a hydrogen atom, Si represents a silicon atom, R' is an alkyl radical containing 1 to 2 carbon atoms, and n is an integer.

Where the inorganic-organic nano-hybrid matrix comprises a branched inorganic-organic nano-hybrid, the inorganic-organic nano-hybrid may have the general form:

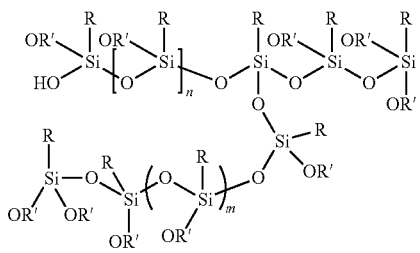

where R represents an organic radical which may contain between 1 and 18 carbon atoms and may contain one or more of oxygen, nitrogen and halogen atoms, O represents an oxygen atom, H represents a hydrogen atom, Si represents a silicon atom, R' is an alkyl radical containing 1 to 2 carbon atoms, n represents an integer and m represents an integer.

Where the inorganic-organic nano-hybrid matrix comprises a crosslinked inorganic-organic nano-hybrid, the inorganic-organic nano-hybrid may have the general form:

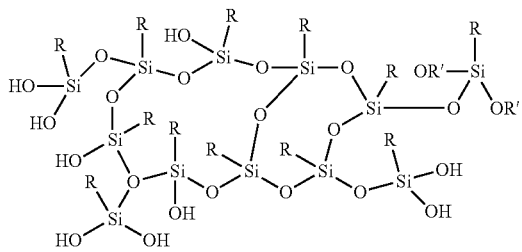

where R represents an organic radical which may contain between 1 and 18 carbon atoms and may contain one or more of oxygen, nitrogen and halogen atoms, O represents an oxygen atom, H represents a hydrogen atom, Si represents a silicon atom, and R' represents an alkyl radical containing 1 to 2 carbon atoms.

The inorganic-organic nano-hybrid matrix may be produced by a sol-gel process from an organosilane starting material or a mixture of organsilane starting materials. The organosilane starting material may comprise an organo alkoxide having the general formula of $R_xSi(OR')_{4-x}$, where x is an integer between 0 and 3, and where x may be 1, 2 or 3 for at least one of the organosilane starting materials.

The inorganic-organic nano-hybrid matrix may be produced by hydrolysing the organosilane starting material, and condensing the hydrolysed organosilane starting material to form one or more of a linear, branched and cross linked inorganic-organic nano-hybrid.

The refractory ceramics particles may comprise a metal oxide ceramic such as any of kaolin, alumina, silica, titanium oxide, zirconium oxide, magnesia, mica, talc and vermiculite. The refractory ceramics particles may have a diameter of less than 100 µm. The surface of the ceramic particles may be modified by treating with one of the organosilane starting materials or a mixture of organosilane starting materials to improve their chemical and physical compatibility with inorganic-organic nano-hybrid matrix.

The composition may further comprise metallic particles suspended in the inorganic-organic nano-hybrid matrix. The metallic particles may comprise any of aluminium, copper, iron and nickel. Each of the metallic particles may comprise an electrical insulator material coating. The coating may comprise a ceramics material such as any of kaolin, alumina, silica, titanium oxide, zirconium oxide, magnesia, mica, talc and vermiculite. The metallic particles suspended in the matrix may increase the thermal coefficient of expansion and increase the thermal conductivity of the encapsulant composition. By moderating the proportion of metallic particles and ceramic particles suspended in the matrix, the coefficient of expansion and thermal conductivity of the encapsulant composition can be controlled to substantially match that of the wire insulation of the encapsulated component. The metallic particles may also increase the resistance to mechanical breakdown of the encapsulant in some cases.

The composition may further comprise fibres suspended in the matrix. The fibres may comprise one or more of a ceramics materials and a glass material, and may be in the form of short fibres or continuous yarns. The composition may comprise 2 to 20% by mass fibres. The addition of fibres increases the mechanical strength of the resultant composition.

The mass ratio of nano-hybrid matrix to particulate ceramics may be in the range of between 20/80 and 70/30 and may preferably be in the range of between 25/75 and 60/40.

The composition may further comprise a solvent. The solvent may be removable from the encapsulant composition by a drying process, and may comprise one or more of xylene, butanol, diacetone alcohol, N-methyl-pyrrolidinone or a mixture thereof. In general, any solvent having a boiling point higher than 100° C. can be used.

The composition may be thermally stable at temperatures up to 450° C. Subsequent to heat treatment at approximately 450° C. for 10 hours, the composition may have a coefficient of thermal expansion from 11 to 28 µm/(m° C.) at a temperature of 350° C. The composition may have a compression strength of greater than 20 MPa.

According to a second aspect of the invention there is provided an electrical machine, the electrical machine comprising an electrically conductive winding encapsulated in an encapsulation composition in accordance with the first aspect of the invention.

The electrically conductive winding may be coated in an electrical insulator. The electrical insulator may comprise a high temperature insulator configured to be chemically and thermally stable at temperatures up to 450°. The electrical insulator may comprise a first organo-alkoxide $^1R_xSi(O^1R')_{4-x}$ and a second organo-alkoxide $^2R_xSi(O^2R')_{4-x}$, where $^1R$ is a non-hydrolysable organic moiety thermally stable to a temperature of at least 150° C., $^2R$ is a non-hydrolysable organic moiety containing a functional group that can react with another like functional group to form an organic polymer, $^1R'$ and $^2R'$ are alkyl radicals and x is an integer from 0 to 3; and an inorganic filler material.

According to a third aspect of the present invention, there is provided a method of encapsulating an electrical winding in an encapsulant composition in accordance with the first aspect of the present invention.

The method may comprise providing an electrically insulated wire, applying an encapsulation composition to the wound wire layer to encapsulate the wire, and winding a further layer of wire around the encapsulated wire.

The method may further comprise curing the encapsulated wire.

BRIEF DESCRIPTION OF THE DRAWINGS

FIG. 2b shows a cross sectional view through the encapsulated electrical winding of FIG. 2a;

FIG. 3b shows an electrical machine comprising the encapsulated winding of FIG. 3a;

FIG. 4a shows a side view of a still further encapsulated machine winding;

FIG. 4b shows a plan view of the encapsulated machine winding of FIG. 4a;

FIG. 5b shows a cross sectional view through the encapsulated electrical winding of FIG. 5a.

DETAILED DESCRIPTION

FIG. 2 shows an encapsulated coil 10 of a high temperature electrical machine. The encapsulated coil comprises windings 12 embedded in an encapsulant 14. Both the windings 12 and encapsulant 14 are capable of operating at temperatures of at least 450° C. for long durations, and are expected to have a total operational lifetime of up to 20 years.

The windings are formed of a conducting material (such as copper) coated in a suitable insulating material such as a material comprising a first organo-alkoxide $^1R_xSi(O^1R')_{4-x}$ and a second organo-alkoxide $^2R_xSi(O^2R')_{4-x}$, where $^1R$ is a non-hydrolysable organic moiety thermally stable to a temperature of at least 150° C., $^2R$ is a non-hydrolysable organic moiety containing a functional group that can react with another like functional group to form an organic polymer, $^1R'$ and $^2R'$ are alkyl radicals, and x is an integer from 0 to 3; and an inorganic filler material.

The encapsulant 14 comprises a silica containing inorganic-organic nano-hybrid matrix, particles of refractory ceramics suspended in the inorganic-organic nano-hybrid matrix, and, optionally, glass or ceramic fibres. The encapsulant may also contain ceramic coated metallic particles, and in some embodiments, a solvent or binder. The formulations can include a solvent, which may be removed during a curing process, or may be solvent-less.

Figure 1:
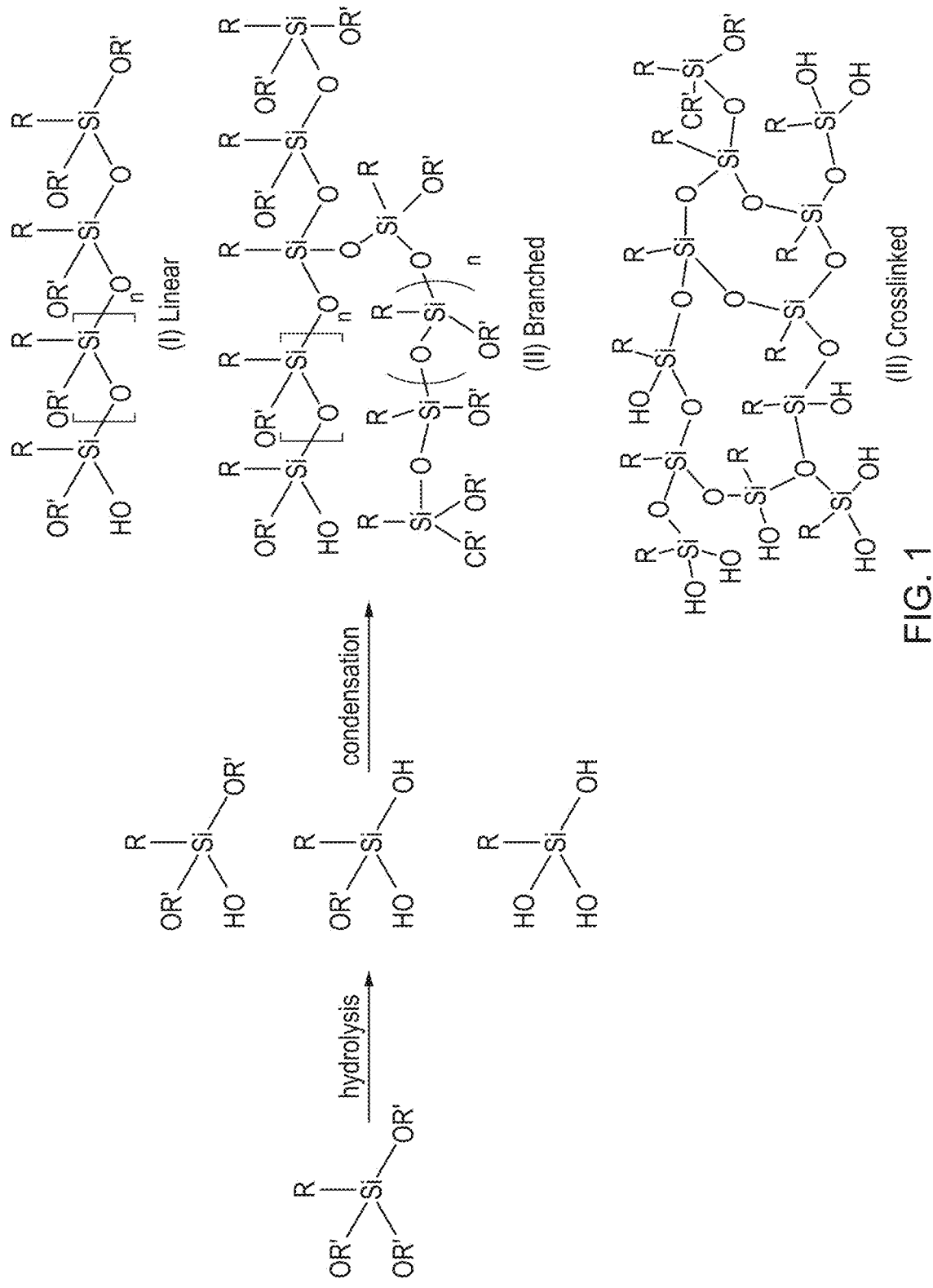
FIG. 1 shows a sol-gel production method for producing an inorganic-organic nano hybrid matrix.

The silica-containing inorganic-organic nano-hybrids have generic molecular structures (I), (II) and (III), as shown in FIG. 1, or a mixture of them. They are prepared via a sol-gel process, using organosilanes as starting materials.

The products of the sol gel process can be directly used to formulate the encapsulants, thus simplifying the manufacturing process, whilst the encapsulants produced are in a form that adapts well to the current encapsulation procedures, or suits encapsulating operations specifically developed for encapsulants of this invention.

The nano-hybrid matrix is an integral part of the encapsulant. It provides the dual functions of being a thermally stable electrically insulating material in its own right, but also acts as a binder to other ingredients in the encapsulants and to the insulation of high temperature wire, and also acts as a processing aider where a solvent is not included in the composition.

The structures and properties of nano-hybrids are controlled by selection of starting reactants and synthetic conditions. In the molecular structure of nano-hybrids (I), (II) and (III) in FIG. 1, R represents an organic radical which generally comprises between 1 and 18 carbon atoms, and may also contain one or more of oxygen, nitrogen and halogen atoms, and R' represents an alkyl containing 1 to 2 carbons; m and n are integers which can take substantially any positive value.

The Si—OR' bond is hydrolysable and the hydrolysis leads to formation of silanol (Si—OH) and alcohol (HOR') as a by product, which is removed from the system by distillation during synthesis and/or curing of the nano-hybrids. The remaining OR' groups in the nano-hybrids may undergo further hydrolysis and/or condensation with the help of a catalyst. This characteristic is exploited into a moisture-curable functionality to the resultant encapsulants. In other cases, the remaining OR' groups may undergo thermal decomposition during heat treatment of the encapsulant composition.

The Si—R bond is non-hydrolysable and will not undergo any chemical change during synthesis and remain as an organic moiety in the resultant silicon containing inorganic-organic nano-hybrids. The organic moiety imparts a degree of toughness to the encapsulants, reduces 'volume shrinkage' during curing, and acts as a modifier for adjusting the thermal expansion and conductivity of the encapsulants, mitigating thermal mismatch between wire and encapsulants and increasing the resistance to thermal shocking for the encapsulated coils. Selection of different R groups and/or their combination allows tuning of the properties of resultant nano-hybrids so as to satisfy requirements for formulating various types of encapsulants for different purposes and conditions. The typical R groups include methyl, ethyl, trifluoromethyl, perfluoroethyl, phenyl, chlorophenyl, pentafluorophenyl, hydrogen, vinyl, glycidyloxypropyl and cyanoethyl, each of which has a high thermal stability. The R group can also be the same as OR' group.

The synthetic conditions during synthesis determine the relative abundance of the different R groups (i, II and III) shown in FIG. 1, and the value of m and n (and in particular, the ratio of m and n) in the resultant nano-hybrids. Structures I and II are preferred to III, because the latter may undergo further condensation during storage, leading to gelation. In principle, small molecular weight (lower m/n ratio) is preferred for formulating solvent-less encapsulants as the nano-hybrid needs to be in liquid form when applied to the windings 12, whilst high molecular weight hybrids are more suitable for compounding solvent-based encapsulants with the benefit of lower volume shrinkage during the curing process. The molecular weight of nano-hybrids is adjusted by controlling the extents of hydrolysis and condensation through varying synthetic conditions during the preparation.

The particulate refractory ceramics are also a critical and functional part of the system. They impart further thermal stability, mechanical toughness and dielectric strength to the encapsulant and also reduce the overall volume contraction and weight loss induced by the curing of nano-hybrids, as well as reduce the material cost substantially. In one example, there is approximately 6% weight loss for the first heat treatment (curing) at 450° C. for 10 hours. Repeated heating at the same condition causes virtually no weight loss. After heat treatment. The encapsulants show the coefficient of thermal expansion ranges from 11 to 28 μm/(m°C.) at temperature of 350° C., depending on the composition. The compression strength of heat-treated encapsulants is higher than 20 MPa.

The particulate ceramics play another critical role in protecting the organic moiety in the nano-hybrids to some extent, by increasing the decomposition temperature of the organic component. For instance, the onset temperature of methyl group decomposition in the pure nano-hybrid is 502° C., whilst this temperature rises to 569° C. when the nano-hybrid matrix includes 45% kaoline particulates suspended therein. This surprising effect of particulate ceramics is very important for compounding high temperature encapsulants.

The performance of particulate ceramics is engineered by particular selection of both chemical composition and particle morphology in consideration of their compatibility with the nano-hybrids, the matching of the thermal expansion coefficient, the proper particle shape, size and distribution, the possibly high thermal conductivity, as well as low cost. Under such guidelines, particulate ceramics chosen for formulating encapsulants are a selection of one or more of various oxides, including but not limited to alumina, silica, titanium oxide, zirconium oxide, magnesia, mica, talc, vermiculite. The particle size is generally smaller than 100 μm. Generally, the mass ratio of nano-hybrid matrix to particulate ceramics may be in the range of between 20/80 and 70/30 and may preferably be in the range of between 25/75 and 60/40.

It is possible to replace a portion of the particulate ceramics with or add extra insulated metallic particles in the encapsulant. The primary effect of the addition of metallic particles is to increase the thermal conductivity and thermal expansion of the encapsulant. This may also produce beneficial mechanical properties, as metals are generally tougher than ceramics. However, the addition of metallic particles may impair the dielectric strength of the composition to some extent. Magnetic and non-magnetic metallic powders can be used for such purpose and some examples are aluminium, copper, iron and nickel powders, etc. The metallic powders are electrically insulated by coating a thin layer of ceramics on the outer surface of the individual particles through sol-gel technology. For different metallic powders, different sol-gel systems may be used.

Glass and/or ceramic fibres may be included in the encapsulant formulation in some cases. This important component has been found to enhance mechanical strength of the resultant encapsulants. It is particularly beneficial for the simultaneous encapsulating processes used or developed in this invention (see below), such as paste, sheet and injection moulding encapsulation methods. However the addition of fibres is not suitable for formulating encapsulants which use traditional dipping encapsulation methods because the existence of fibres may block gaps between wire turns of the pre-formed coil, preventing impregnant from filling up the voids inside the coil. The fibres used here are generic glass fibres and/or ceramic fibres, and may comprise similar ceramics to the ceramic particulates. They may be in the form of chopped short fibres or continuous yarns.

The mass ratio of nano-hybrid resin to particulate ceramics ranges from 20/80 to 70/30, preferably from 25/75 to 60/40. In case of fibres are included in the formulation, they take the mass fraction from 0.02 to 0.2 of the total encapsulant. The selection of the ratio depends not only on the properties of the encapsulants, but also on the physical form of the encapsulants and the method of encapsulation. In general, a lower ratio of nano-hybrid to ceramic powders and fibres can be accepted for the solvent based encapsulants, because the existence of solvent will compensate for the viscosity increase caused by the high loading of ceramic particles and fibres. Encapsulants with lower nano-hybrid fraction can also be used if injection moulding is applied for the encapsulation. However, a higher ratio may be suitable for the paste encapsulation as proper consistency is needed for conveniently spreading the paste, but without dripping during the simultaneous encapsulation.

Example 1

A first electrical encapsulant composition comprising a silica containing inorganic-organic nano-hybrid matrix, and particles of refractory ceramics suspended in the inorganic-organic nano-hybrid matrix is produced as follows.

Silicon containing Methyltrimethoxysilane 40.8 g is charged in a flask. Dilute hydrochloric acid (HCl, 1N concentration) 5.4 g is added drop by drop to this mixture under vigorous stirring. After addition of hydrochloric acid solution, the reaction mixture is heated to reflux for 6 hours and followed by distilling out the by-product, methanol. The nano-hybrid resin thus synthesised is of the structures I and II (see FIG. 1) with a proper fraction of OR' groups remaining in the molecules because insufficient water is available for hydrolysing all OR' groups in the example. These OR' groups have been found to keep the resin in liquid form, and are relatively stable at room temperature. The OR' groups may be subject to further hydrolysis/condensation with moisture to form cross-lined hybrid resin (structure III in FIG. 1) in the presence of an appropriate catalyst. This property provides a moisture-curing function to the encapsulant.

In other syntheses, the amount of hydrochloric acid solution added can be increased or decreased in order to adjust the value of m/n in structures I and II, in order to obtain nano-hybrid resins with various viscosities.

In other cases, the refluxing time can be shortened or extended in order to increase or decrease the m/n ratio, and hence the viscosity of resultant nano-hybrid resins.

Example 2

In example 1, the non-hydrolysable R group is methyl, which remains in the resin after curing. In example 2, a phenyl group is introduced into the nano-hybrid resin.

A second electrical encapsulant composition can be formed as follows. Methyltrimethoxysilane 32.6 g and phenyltriethoxysilane are mixed in a flask. 5.94 g HCl solution is dropped into the mixture under vigorous stirring. After addition of HCl solution, the reaction is kept refluxing for 12 hours and then the by-products, methanol and ethanol, are driven out by distillation. A clear viscous resin is thus produced.

In other syntheses, the molar ratio of methyl to phenyl can vary in the range from 30/70 to 98/2. Increase of phenyl group leads to increase of thermal stability and thermal expansion coefficient of the cured nano-hybrid resins.

Again, the amount of HCl solution and the refluxing time may also be changed to adjust the properties of resultant nano-hybrid resins.

Example 3

A third electrical encapsulant composition can be formed as follows.

Methyltrimethoxysilane 32.6 g, trimethylmethoxysilane 6.2 g, vinyltriethoxysilane 2.8 g and triethoxysilane 2.5 g are mixed in a flask. Phosphoric acid 0.75 g is dissolved in water 10.8 g and the acidic water is added drop by drop into the above mixture under vigorous stirring at room temperature.

Afterwards, the reaction system is heated to refluxing and kept at this condition for 20 hours. Then the by-products, methanol and ethanol, are distilled out by gradually raising the temperature to 100° C. The clear nano-hybrid resin in liquid form is then obtained and ready for compounding.

The resultant nano-hybrid resin may be cured by the addition reaction between Si—H vinyl group in the presence of appropriate catalysts, e.g. platinum.

The ratio of methyltrimethoxysilane to trimethylmethoxysilane can be varied to adjust the viscosity of the resultant resins, with a higher ratio leading to higher viscosity. The amount of vinyltriethylsilane and triethoxysilane in the resin can be used to control the curing speed and cross-linking density of the cured resin.

Example 4

A fourth electrical encapsulant composition can be formed as follows.

Methyltrimethoxysilane 26.12 g, phenyltrimethoxysilane 25.34 g, trimethylmethoxysilane 8.32 g and N-methylpyrrolidine 24.0 g are mixed in a flask and stirred at room temperature for 10 minutes. Then 1N HCl solution 9.36 g is added drop by drop under vigorous stirring. After addition of HCl, the reaction system is heated to 60° C. and kept stirring for 20 hours. Afterwards, the temperature is raised to 85° C. and the by-product methanol is distilled out. The temperature is then gradually increased to 120° C. The solution is then distilled further until no further distillate can be removed. The reaction system is then cooled to room temperature, and aged for at least one day. Further N-methylpyrrolidine is then added to dilute the hybrid resin solution to about 50 wt % concentration.

In other preparations, the molar ratio of methyltrimethoxysilane to other silanes varies from 50% to 100%; the molar ratio of phenyltrimethoxysilane from 0% to 50%; and the molar ratio of trimethylmethoxysilane from 0% to 25%.

The reaction temperature and time, as well as the amount of 1N HCl solution, can also be changed to enable preparation of desirable nano-hybrid resin solutions.

The final resin concentration can be variable depending on the requirement for compounding appropriate encapsulants/impregnants.

Example 5

A fifth electrical encapsulant composition comprising a "paste encapsulant" can be formed as follows. The paste encapsulant is a solvent-less encapsulant (i.e. is substantially free of solvent) and is suitable for a particular coil winding process hereinbelow referred to as "simultaneous encapsulation", wherein the coil is wound and encapsulation is completed at the same time. This differs from conventional low temperature procedures in which the encapsulation composition is applied to the preformed coils; typically by 'vacuum dipping impregnation' or 'vacuum and pressure impregnations'.

The encapsulant is first made into a paste form with higher viscosity than that of the encapsulant used for the aforementioned techniques. During the encapsulation, the paste encapsulant is applied to the surface of the coil 12, and then the subsequent layer of coil is wound on. Unlike conventional techniques, this process does not require the encapsulant to be able to flow through the narrow gaps between wire turns in a preformed coil since the paste 14 is already in place and is squeezed into the void spaces when the wire is wound on. Consequently, encapsulant compositions having a higher viscosity can be used. The low flowability (i.e. high viscosity) of this type of ceramic particle-containing encapsulant becomes an advantage rather than a hindrance because higher loading of particulate ceramics is also beneficial to the thermal stability of final product. The selection of a solvent-less nano-hybrid resins speeds up the encapsulation process as there is no need to dry the encapsulant. In addition, substantially full filling of voids inside the coil is achievable if no solvent is used in the paste formulation, resulting in an encapsulated machine coil having substantially no voids. The encapsulation method can employ standard winding equipment, allowing the process to be used in a conventional manual or machine winding operation.

Paste encapsulants typically consist essentially of the inorganic-organic nano-hybrid resin and particulate ceramics. However, the nano-hybrids are specially synthesised for this kind of encapsulant and encapsulation route. A moisture-curing mechanism is adopted so that the encapsulant cures at ambient temperature, humidity and pressure. The mass ratio of resin to ceramics varies from 25/75 to 50/50 for these paste encapsulants.

A catalyst is required to promote the moisture-curing process. The catalyst may be chosen from titanium alkoxides, titanium ethylhexanoate and tin(II) ethylhexanoate and the addition of the catalyst is in the range from 0.1 to 5 mass percent depending on the nano-hybrid resins used and the curing rate needed.

Example 6

A fifth electrical encapsulant composition comprising an alternative paste encapsulant can be formed as follows. 0.08 g of titanium butoxide (catalyst) is dissolved in 8.0 g of the inorganic-organic nano-hybrid resin synthesised in Example 1, and then mixed with 12.0 g of particulate ceramics. The mixture is then kneaded until a paste is obtained.

The particulate ceramics are a combination of a variety of inorganic powders. In this embodiment, the particulate ceramics comprise talc 6.48 g (54 wt %), magnesia 4.32 g (36 wt %) and vermiculite 1.20 g (10 wt %). These ceramic powders are well mixed before mixing with the nano-hybrid resin.

Simultaneous Paste Encapsulation

Figure 2A:
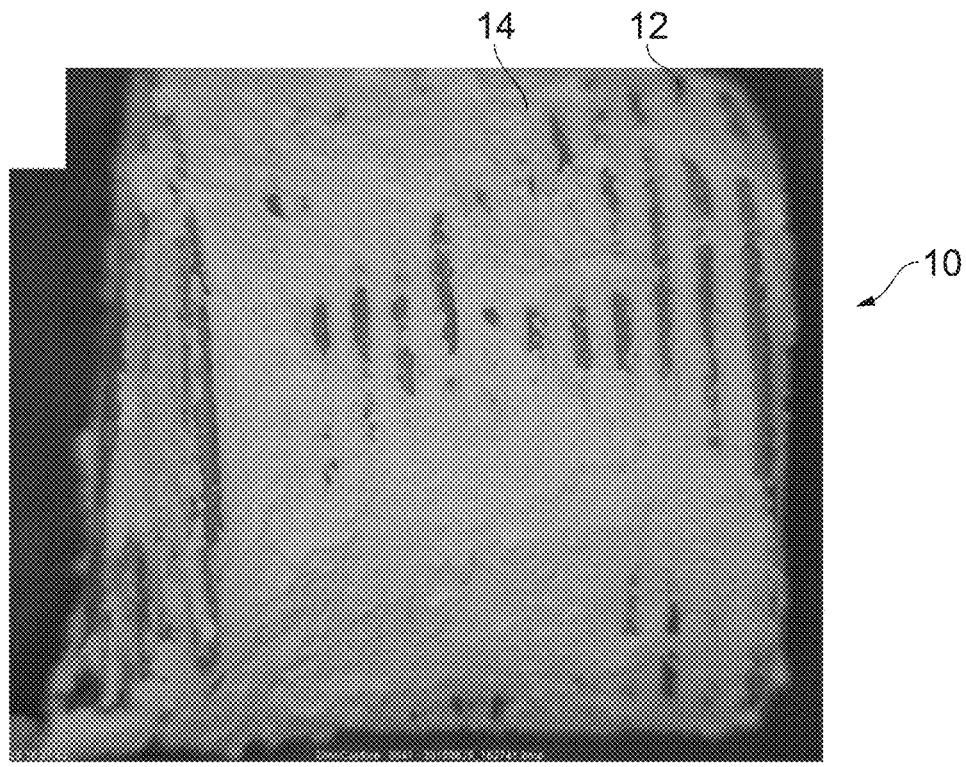
FIG. 2a shows an electrical winding of an electrical machine encapsulated in a first encapsulant in accordance with the invention.
Figure 2B:
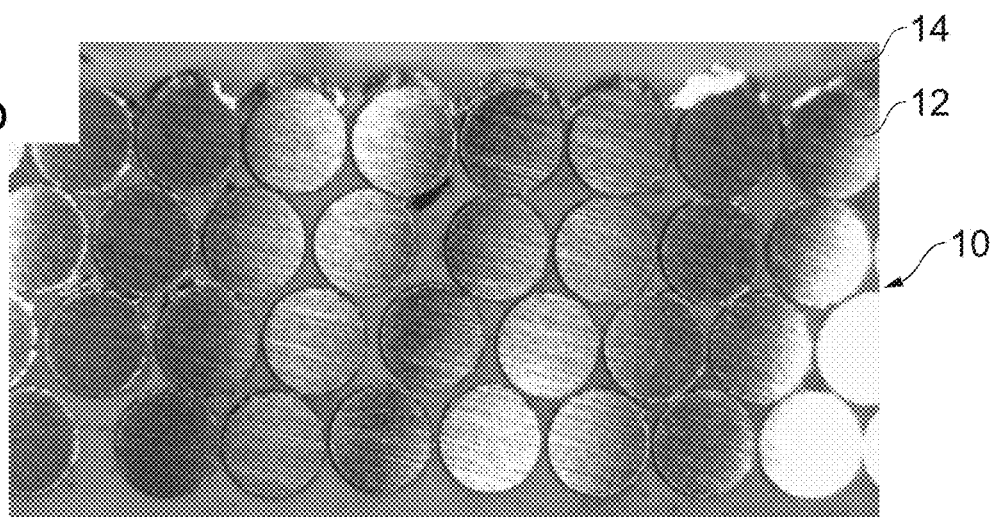

The resultant paste is immediately used for the simultaneous encapsulation of a sample coil. Firstly the paste is spread on a former and then the wire is immediately wound on to the former. After the first layer of coil 12 is wound, another portion of paste is applied on the surface of the layer and the wire 12 is again wound on to form the second layer of the coil 12. This procedure is repeated until the required coil 10 is formed. This simultaneously encapsulated coil is kept under ambient condition at least 12 hours to allow the moisture induced curing to complete, and longer time may be required, depending on the size of the coil. The cured coil is then heat treated at a defined temperature. FIGS. 2a and 2b show a sample encapsulated coil 10 fabricated following this procedure. It can be seen that a high integrity coil is achieved and the internal spaces among wire are almost fully filled by the encapsulant, leaving substantially no void spaces (clearly shown in FIG. 2b). The sample coil shown in FIG. 2 was heated at 450° C. for 10 hours.

The moisture-curing of the simultaneously encapsulated coil can proceed under ambient conditions, i.e. leaving the coil in room temperature for a period of time. For this sample coil (outer diameter 22 mm, inner diameter 12 mm, height 20 mm, 4 winding layers), two days were required to ensure good curing under ambient conditions (temperature~20° C. and relative humidity~60%), but longer curing times will not affect the performance of the encapsulated coil. For larger coils, longer curing times are required accordingly. Curing procedure can be accelerated by increasing temperature, but over 100° C. is not recommended.

The cured coils are ready to use or may undergo heat treatment at elevated temperature. The process consolidates the encapsulant and burns out some organic moiety depending on the composition of the nano-hybrid resins. Heat treatment can be performed by heating the coil in a furnace or heating on site during the service of the electrical machine. In this embodiment, the sample coil is heated at 450° C. for 10 hours with the heating and cooling rate at 10° C./minute.

Example 7

A seventh electrical encapsulant composition can be formed as follows. Titanium butoxide 0.42 g is well mixed with 28.0 g of the nano-hybrid resin containing both methyl and phenyl groups as synthesised in Example 2. Particulate ceramics 38.2 g and silica fibres 3.8 g are then added. After the ingredients are well mixed, the mixture is kneaded for a period of time to form a consistency paste.

Figure 3A:
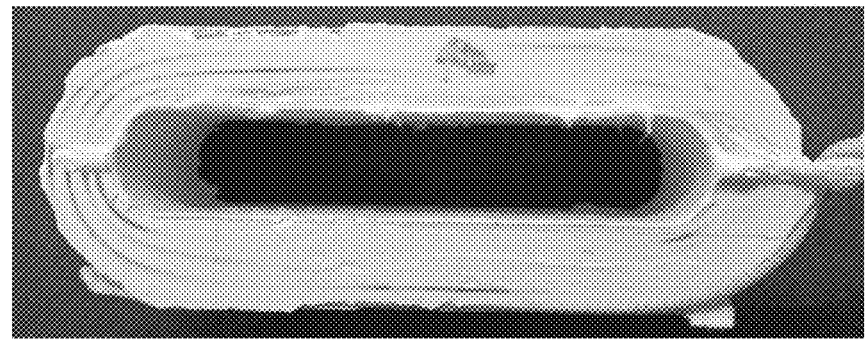
FIG. 3a shows a further encapsulated electrical winding.
Figure 3B:
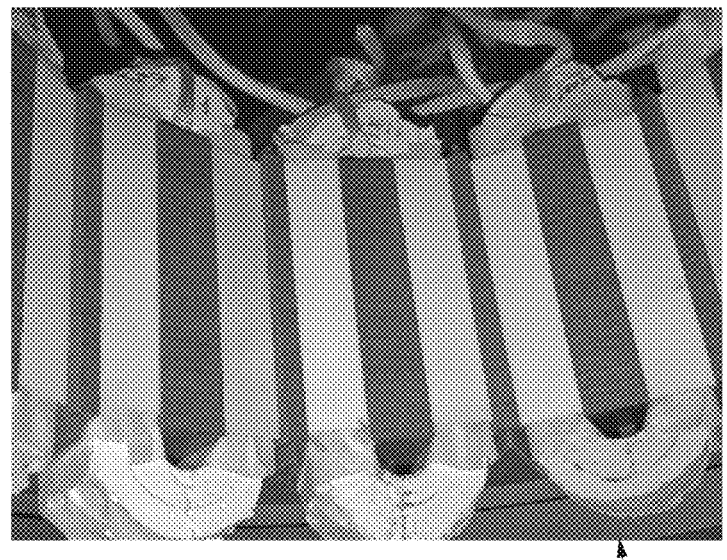

The prepared paste encapsulant is then used for simultaneous encapsulation of electric coils following the procedure as shown in above in relation to Example 6. The introduction of ceramic or glass fibres has a positive effect on the paste encapsulation process by improving the consistency of the paste. It also reinforces bulk strength and reduces cracking of the cured encapsulant. FIG. 3a depicts an example of a paste encapsulated coil winding 110 which forms part of an electric stator 120 for a motor, shown in FIG. 3b. The stator 120 shown in FIG. 3b has been successfully tested at temperatures in excess of running at 400° C.

Example 8

In addition to a paste encapsulant, the solvent-less system can also be specially formulated to suit injection moulding encapsulation through modification of the inorganic-organic nano-hybrid resins and the selection of appropriate particulate ceramics. The viscosity requirement for injection moulding is higher than that for paste spreading, so that higher viscosity nano-hybrid resin and lower resin to ceramics ratio may be required. The applicable ratio of nano-hybrid matrix to particulate ceramics is from 15/85 to 40/60 by mass, and the preferred range is from 20/80 to 30/70. A typical example is given below.

The encapsulant is formed by premixing talc 40.0 g, kaolin 15.0 g, vermiculite 12.0 g and boron oxide 8.0 g in a porcelain jar and ball-milling for 4 hours. The resulting mixture is then mixed with the nano-hybrid matrix 25.0 g synthesised in Example 3 and thoroughly kneaded to produce a high consistency mixture with very high viscosity. The encapsulant is then ready for injection moulding encapsulation.

Figures 4A, 4B:
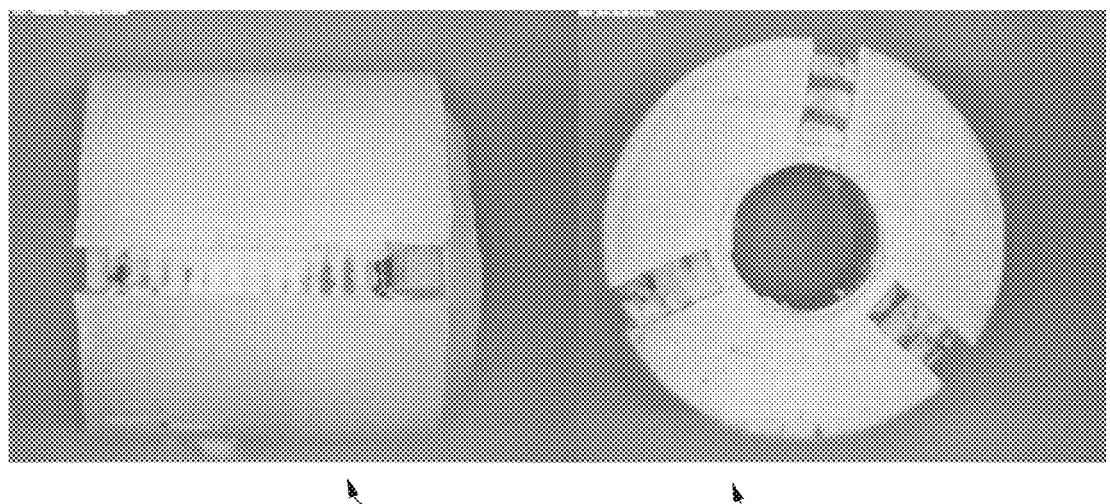

Encapsulation by injection moulding is carried out using a micro injector. A pre-formed coil is mounted in the mould chamber of the micro injector and then vacuumed. The encapsulant is loaded into a syringe chamber and forced into the mould through channels by applying pressure via turning a screw to move the piston forward. After injection, the encapsulated coil can then be cured in the mould or directly de-moulded and then cured in an oven. An encapsulated coil 210 formed by injection moulding is shown in FIGS. 4a and 4b. As can be seen, the injection moulding method provides a machine coil having a precise shape. The encapsulated coil shown in FIGS. 4a and 4b was fabricated by injection moulding after thermal treatment at 400° C. for 10 hours.

Example 9

The high temperature encapsulants can also be formulated into solvent-based system so as to adopt the conventional techniques of impregnation to process this new type of encapsulants. The addition of a solvent enables an increase of the ratio of particulate ceramics to the nano-hybrid matrix in the formulation, as the viscosity of the resulting encapsulants can be adjusted to a desired value by changing the amount of solvent in the formulation. However, the more the solvent used in the formulation, the less the void-filling effectiveness of the impregnated coils, because the solvent will take a fraction of volume of void spaces in a coil and will leave this part of void spaces empty again after evaporation. For this reason, it is difficult to gain full void-filling effect for solvent-based encapsulant.

The solvent-based encapsulant is formulated as follows: The above synthesised nano-hybrid resin 27.0 g (Example 5), talc 9.9 g, kaolin 3.3 g, vermiculite 1.8 g, boron oxide 1.5 g, N-methylpyrrolidine 12.0 g and a solvent, diacetone 12.0 g are mixed together and ball-milled for 1 day. The encapsulant is thus ready for use. Other solvents may be used, such as any of xylene, butanol, diacetone alcohol, N-methylpyrrolidinone or a mixture thereof.

Impregnation of a sample coil is carded out through a conventional vacuum dipping process. The solvent-based encapsulant in a beaker is put into to a vessel chamber connecting to a vacuum line, and then a pre-formed coil to be impregnated is hung above the encapsulant. After evacuating the chamber, the coil is slowly dipped into the encapsulant until the whole coil is immersed in the encapsulant. Air is gradually reintroduced into the chamber. The atmospheric pressure will force the encapsulant to flow into the void spaces within the coil. The impregnated coil is then slowly lifted out of the encapsulants, and the excess encapsulant is allowed to drip off. The impregnated coil is then dried in an oven at 80-120° C. for approximately 12 hours, and then heat treated at 350-450° C. for 10 hours. This procedure can be repeated several times as required.

Figure 5A:
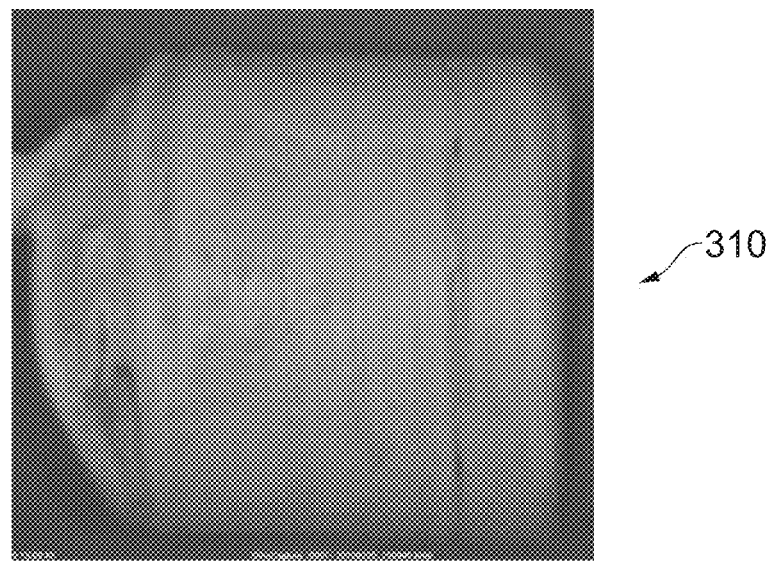
FIG. 5a shows a still further encapsulant electrical machine winding.
Figure 5B:
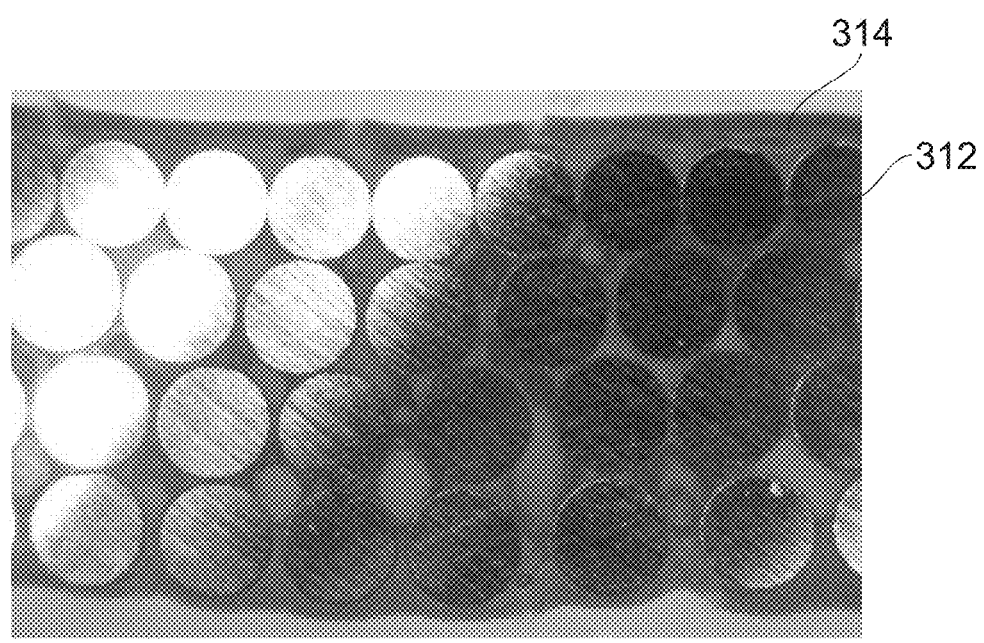

FIGS. 5a and 5b show a side view and a cross sectional view respectively of a further sample coil 310 impregnated with this solvent-based encapsulant. The coil 310 was impregnated twice, after first impregnation, the coil is heated at 450° C. for 10 hours and then the second impregnation was performed. The encapsulant 314 mainly stays at the trough between two adjacent wires 312 and the filling amount of void spaces is similar to organic polyimide impregnant, but less than the paste encapsulation, as can be clearly seen in FIG. 5b.

The invention provides electrical encapsulant compositions and encapsulation methods which result in encapsulated windings or coils of electrical machines which are capable of long-term operation (e.g. for several years) at temperatures of at least 450° C. or potentially greater (as compared to 220° C. with conventional polymer based solutions). The encapsulant formulations may also be used as a slot liner within a machine coil, or in electrical connections, such as joints or terminations.

The combination of inorganic-organic nano-hybrids with particulate ceramics is unique for this new type of encapsulants, where the nano-hybrid plays a key role as the binder, so that there is no need to sinter the ceramic component at elevated temperatures. This is advantageous, since the conductive wire and magnetic core cannot usually withstand the high temperatures required for sintering. The particulate ceramics also provide further thermal and electrical resistance to the encapsulants and reduce the shrinkage of the nano-hybrids during curing. The excellent thermal stability of the encapsulant composition is provided in part by the nature of ceramic materials, since the nano-hybrid is itself a high temperature insulator. The good thermal shock resistance provided by the composition allows application in extreme thermal environments. The composition has been found to have excellent oil resistance and chemical inertness suitable for aggressive surroundings. The composition also has excellent adhesion properties and compatibility with high temperature wire insulation compositions because of their chemical, physical and thermal similarities, ensuring long-term stability. There is little outgassing in service because the encapsulants are converted into ceramics. The composition and resultant encapsulated machine coils have a low manufacturing cost, owing to the material used in the formulations and as a consequence of common starting materials with the wire insulation formulation.

The versatility of the encapsulation formulation is another distinctive feature of this new type of encapsulant. As described above, the encapsulants can be formulated with or without solvents, or can be made into various physical forms such as a suspension, which can be processed using conventional impregnating technologies, and a paste which is applied through a new procedure of simultaneous encapsulation. The versatility also refers to the structure and property of the encapsulants. A wide spectrum of encapsulants can be fabricated by means of changing the properties of the two major components, nano-hybrids and ceramics, and their combinations. As a result, they can be tailored to specific applications.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the above described encapsulant formulations may also be used as a slot liner, or in electrical connections, joints or terminations in an electrical machine.

More generally, the encapsulant compositions described herein are applicable in any devices where electrical insulation and/or thermal conductivity is required at high temperatures (typically above 400° C.). Examples include actuators and transducers.

The wire insulation material described in WO2009150463 can be applied in a range of applications as protective coatings for high temperature applications. The invention is particularly, though not exclusively, useful for providing encapsulation for materials coated in such insulation material. However, since the encapsulant composition can be tailored by adjusting the relative amounts of organic-inorganic nano-hybrid matrix and ceramic and ceramic coated particulates, the encapsulant is suitable for use with a wide range of wire insulation materials.

Other encapsulation methods could also be employed to encapsulate electrical apparatus with the above described encapsulation composition. For example, a "coat encapsulation" method could be employed. In this route, the encapsulant is coated on the wire and then the coated wire is immediately wound into coils. Both solvent-based and solventless encapsulants are applicable for this encapsulating technology. The advantages of this route include the convenient adaption into automated winding operation because the process is very similar to that of insulated wire production. Accurate control of the encapsulant loading by means of simple adjustment of encapsulant concentration through the development of an appropriate device to undertake this operation could be achieved. The encapsulant coated on the wire should be able to flow into the void space under the gentle pressure of winding force when the wire is wound into coil. This means the encapsulant is required to be soft or in part fluid and part solid form after being coated and dried on the insulated wire.

Alternatively, an "extrusion encapsulation" method could be employed. In this route, the encapsulant is delivered by means of extrusion onto the wire as it is wound on to the coil. The encapsulant can be extruded through a die so that it will uniformly and entirely cover the wire. Alternatively, the encapsulant may be extruded on one side of the wire, or on the right point of the coil surface where the wire is wound on. Similar to above coat encapsulation, this process can accurately deliver the loading amount of encapsulant and well adapts to current machinery for automated coil winding. The encapsulants used for this operation have the viscosity similar to those used for encapsulation of injection moulding and solventless formulation is preferred.

The invention claimed is:

1. A method of encapsulating an electrical winding in an encapsulant composition, the encapsulant composition comprising a silica containing inorganic-organic nano-hybrid matrix, and particles of refractory ceramic suspended in the inorganic-organic nano-hybrid matrix, wherein the encapsulant composition is solventless, and the particles of refractory ceramic have a diameter of less than 100 μm, the method comprising:
   providing an electrically insulated wire,
   applying the encapsulation composition to the electrically insulated wire to encapsulate the wire, and
   winding a further layer of wire around the encapsulated wire.

2. The method according to claim 1, wherein the inorganic-organic nano-hybrid matrix comprises one or more of a linear, branched, and cross-linked inorganic-organic nano-hybrid comprising an organic moiety comprising Si—R, where Si represents a silicon atom and R represents an organic radical.

3. The method according to claim 2, wherein the organic radical R contains between 1 and 18 carbon atoms.

4. The method according to claim 3, wherein the organic radical R further contains one or more of oxygen, nitrogen, and halogen atoms.

5. The method according to claim 1, wherein the inorganic-organic nano-hybrid is a linear inorganic-organic nano-hybrid comprising an organic moiety comprising Si—R, where Si represents a silicon atom and R represents an organic radical.

6. The method according to claim 1, wherein the inorganic-organic nano-hybrid matrix is produced by a sol-gel process from an organosilane starting material.

7. The method according to claim 6, wherein the inorganic-organic nano-hybrid matrix is produced by hydrolyzing the organosilane starting material, and condensing the hydrolyzed organosilane starting material to form one or more of a linear, branched, and cross-linked inorganic-organic nano-hybrid.

8. The method according to claim 1, wherein the particles of refractory ceramic comprise a metal oxide ceramic.

9. The method according to claim 1, wherein the encapsulant composition further comprises metallic particles selected from the group consisting of aluminium, copper, iron, and nickel that are suspended in the matrix.

10. The method according to claim 9, wherein each of the metallic particles comprises an electrical insulator material coating.

11. The method according to claim 1, wherein the encapsulant composition further comprises fibres suspended in the matrix.

12. The method according to claim 11, wherein the fibres comprise one of short fibres and continuous yarns.

13. The method according to claim 11, wherein the encapsulant composition comprises 2 to 20% by mass fibres.

14. The method according to claim 1, wherein the mass ratio of the inorganic-organic nano-hybrid matrix to the particles of refractory ceramic is in a range of between 20/80 and 70/30.

15. The method according to claim 13, wherein the mass ratio of the inorganic-organic nano-hybrid matrix to the particles of refractory ceramic is in a range of between 25/75 and 60/40.

* * * * *